March 3, 1970 R. C. MURRAY 3,499,066
METHOD FOR MANUFACTURING ISOSTATICALLY PRESSED ARTICLES
HAVING OPENING OR INSERTS THEREIN
Filed July 17, 1967

INVENTOR.
Ronald C. Murray
BY
Barnard, McGlynn & Reising
ATTORNEYS

United States Patent Office 3,499,066
Patented Mar. 3, 1970

3,499,066
**METHOD FOR MANUFACTURING ISOSTATI-
CALLY PRESSED ARTICLES HAVING OPEN-
INGS OR INSERTS THEREIN**
Ronald C. Murray, Crescent Village, Colo., assignor to
Coors Porcelain Company, Golden, Colo., a corpora-
tion of Colorado
Continuation-in-part of application Ser. No. 434,380,
Feb. 23, 1965. This application July 17, 1967, Ser.
No. 660,550
Int. Cl. B28b 7/06, 21/56, 21/92
U.S. Cl. 264—56                     10 Claims

ABSTRACT OF THE DISCLOSURE

A method for manufacturing an article by compacting a compactable material comprising placing one or more arbors within a generally tubular-shaped resilient collapsible mold, filling the mold with a compactable material after which the arbor or arbors are supported within the mold only by the compactable material such that the arbors or arbors are free to shift within the mold during compaction of the material, and thereafter applying pressure to the mold to compact the material. After compaction the arbor or arbors can be removed to provide a bored article or they can be left in place to provide an article with one or more inserts therein.

---

This invention relates to method for the manufacture of articles from compactible materials such as ceramic or metal powder, and more particularly to a method and apparatus for isostatically pressing and then sintering a body having one or more bores or inserts therein. This application is a continuation-in-part of patent application Ser. No. 434,380 filed Feb. 23, 1965, and now abandoned.

One of the methods presently commonly used for the manufacture of sintered ceramic articles is the so-called isostatic pressing process which is taught, for example, in United States Patents 2,251,454 and 2,290,910. In this process the ceramic material, prepared in a loose compactable finely divided form, is placed in a rubber or other elastomeric collapsible mold after which fluid pressure is applied to the outside of the elastomeric mold such that the mold partially collapses and thereby compacts or compresses the ceramic material into a self-sustaining green compact. Upon relieving the fluid pressure from the elastomeric mold, the mold withdraws by way of its own resiliency from the green compact and the compact is thus easily removed from the mold for subsequent firing to sinter the ceramic. One of the big advantages to this process is the excellent uniformity attained in compaction of the ceramic which assures excellent high density in the fired articles with minimum possibilities of warpage or other distortion during firing.

The chief limitation to this isostatic pressing process is that at the present state of the art, it can be effectively used only for the manufacture of relatively simple ceramic shapes such as rods and cylinders. It is used to considerable advantage, for example, for the manufacture of simple tubular bodies by utilizing a rod-shaped metal arbor fixed in a concentric position within a tubular rubber mold so that the ceramic material is compacted around the arbor, the latter being withdrawn, as the resulting compact is withdrawn from the mold prior to firing. For the manufacture of other shapes such as a tubular member with a non-concentric bore or a member with a plurality of bores, it has been necessary to use other processing techniques albeit these other techniques are more expensive or are otherwise not as good as isostatic molding.

It is the principal object of the present invention to provide a method for isostatic pressing whereby relatively complex articles having one or more bores therein can be manufactured easily and at low cost. Another object is the provision of a method for manufacturing, by isostatic pressing, articles having one or more inserts therein. More specifically, the invention has as one of its objects the provision of a method whereby there can be manufactured, by isostatic pressing, a sintered body having one or more elongated bores or inserts in non-concentric relationship with the outer surface of the body. Hence, by the practice of the invention multi-bore or multi-insert articles of ceramic, metal or other sinterable material, and having any of a variety of external configurations, can be manufactured by the isostatic pressing technique.

Briefly these objects are accomplished in accordance with the invention by utilizing one or more arbors within the collapsible mold which are free to move with the material upon compression thereof when the pressure is applied to the collapsible mold. If bores are desired in the finished article, the arbors are removed after pressing and prior to firing or, are made of material which vaporizes or otherwise disintegrates during the firing operation. Alternatively, the arbors can be inserts desired in the finished article in which case they are left in the pressed article through the firing operation to become an integral part of the finished article. In the preferred embodiment the arbor or arbors are supported solely by the compressible material itself at the time the mold is collapsed. Hence, the arbors move with the material as though they were a part of the material when the pressure is applied. Surprisingly, the arbors shift very precisely with the material upon compression thereof and hence the exact number of bores or inserts in the exact configuration desired can be easily attained in the pressing operation. After pressing, the arbors can be removed from the resulting green compact and the compact then fired to sinter the material.

Other objects, features and advantages of the invention will appear more clearly from the following detailed description of preferred embodiments thereof made with reference to the drawings in which.

Figure 1:
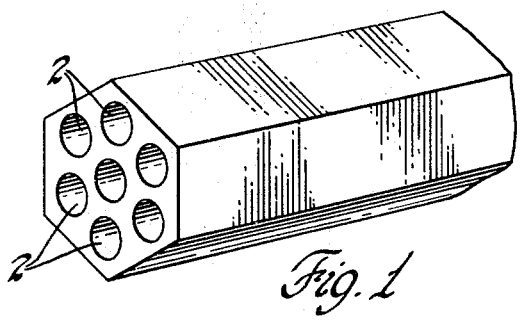
FIGURE 1 is a perspective view of a tubular shaped body made in accordance with the invention.

Referring now to FIGURE 1, there is shown a generally tubular shaped article which has a hexagonal exterior shape and a plurality of parallel cylindrical bores 2 extending therethrough. This multi-bored structure is typical of those required for numerous heat exchanger and the like applications. It might be made of ceramic or of metal depending upon the particular use for which designed. Prior to the present invention, in order to manufacture such a shape by the isostatic pressing process it was necessary to first press a solid rod and thereafter form or attempt to form the bores by a drilling operation. Such a drilling operation is troublesome and expensive, with considerable scrap loss, and hence the isostatic process was not practical for production of such parts. Instead, multi-holed parts of such shape have heretofore been commonly made by dry pressing, using steel punches and dies. Parts made by this method are limited to lengths of about twice the diameter, because it is impossible to obtain the uniform compaction which is inherent in isostatic pressing.

Figure 2:
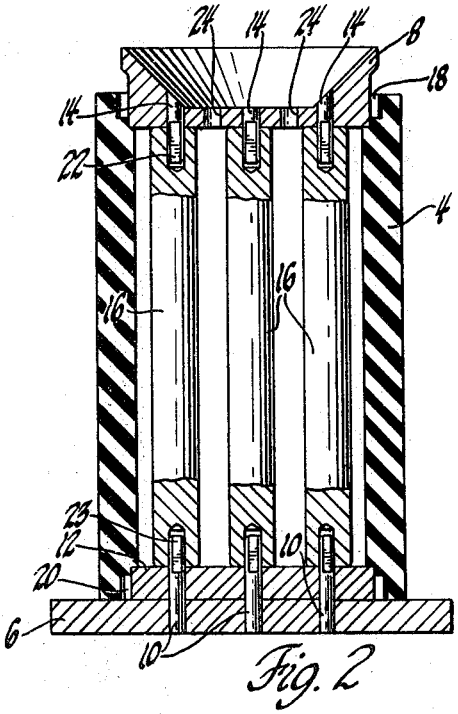
FIGURE 2 is the side view in section of apparatus for manufacturing the article shown in FIGURE 1 in accordance with the invention.
Figure 3:
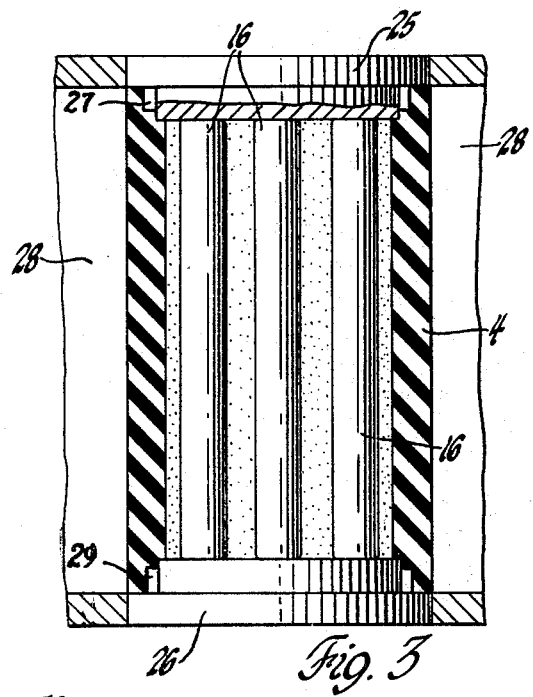
FIGURE 3 is a side view in section of the apparatus shown in FIGURE 2 but in a later step in the method and with certain parts removed and replaced by other parts.
Figure 4:
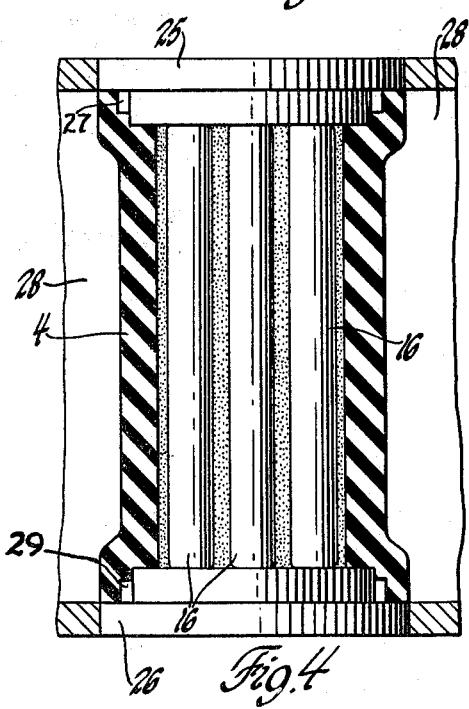
FIGURE 4 is a view of the apparatus shown in FIGURE 3 but at a later stage in the method of this invention.

FIGURES 2 through 4 show the manner in which parts of the configuration shown in FIGURE 1 can be manufactured in accordance with the present invention. In FIGURE 2, 4 is a tubular resilient rubber mold having a hexagonal shaped inner surface and extending between a metal filling base 6 and a metal filling cap 8. The filling base has spaced upwardly extending pins 10 secured thereto. These pins extend slidably through holes provided in the lower mold end plate 12 which is likewise of metal and which abuts the filling base 6. The filling cap 8 has downwardly extending pins 14 secured thereto, each of the pins 14 being aligned with one of the pins 10 which extend upwardly from the filling base. Extending between and supported by the pins 10 and 14 are arbors 16. Each of these arbors has recesses at the top and bottom thereof for slidable mating engagement with a pair of the aligned bottom and top pins 10 and 14 respectively. To assure proper orientation of the filling cap with respect to the filling base in the assembly, a locating lug can be provided on each of the mold end plate 12 and the filling cap 8 for engagement with mating recesses in the resilient mold. Such is indicated at 18 for the filling cap and at 20 for the mold base member. Particularly where the arbors are other than round and where it is required that they have predetermined orientation, cross-sectionwise, with respect to each other and with respect to the rubber mold, the support pins 10 and 14 along with the mating recesses in the arbors, as shown at 22 and 23, can be flat sided such that the arbor recesses mate with the support pins only when the arbors are rotated to their proper predetermined orientation.

The filling cap has openings 24 which communicate with the funnel shaped upper surface of the filling cap. With the mold assembled as shown, loose finely divided ceramic material, metal or other sinterable material as desired, is fed into the mold through the openings 24. It is important that the density of the material be relatively uniform within the mold and to accomplish this it is advantageous to vibrate the mold assembly during the filling operation. Such vibration assures against voids and hence provides optimum uniformity of density of the material within the mold from top to bottom and from side to side thereof. It will, of course, be apparent that to assure the desired density and uniformity of density from one part to another manufactured with the process, the desired predetermined amount of material should be added and the vibration continued until all of this predetermined amount of material has gone through the openings 24 into the mold.

As indicated above, the material introduced into the mold and from which the article is to be made should be in a loose finely divided compressible form. It is highly desirable that the material be in the form of extremely small spherical or other particles prepared by conventional processes and it is generally also advantageous to include a small amount of organic binder material, as well known in the art, to assure good green strength in the compact formed by the pressure application as will hereinafter be described. The aforesaid patents teach one manner of preparing the finely divided material, including a small amount of organic binder, for the isostatic pressing operation.

After the mold is filled, the filling base 6 and the filling cap 8 together with their associated pins 10 and 14 are withdrawn from the assembly and the filling cap is replaced by a unitary metal upper end plate 25 which snugly engages the upper end of the tubular collapsible mold 4, all as shown in FIGURE 3. The mold assembly can be inverted and the filling base 6 and plate 12 replaced by a base plate 26 in a similar manner as 25. If desired, the plate 12 can be left in place and plate 6 replaced with a plate similar to 6 but with shorter pins which just fill and do not extend above the holes in plate 12 left vacant by the withdrawal of pins 10. The plates 25 and 26 have locating lugs 27 and 29 similar to those 18 and 20 of the filling cap and end plate shown in FIGURE 2.

With the arbor support pins 10 and 14 having thus been withdrawn, the arbors 16, previously held in spaced relationship to the mold and to each other by the pins, are now supported in their positions with respect to each other and with respect to the mold 4 in directions normal to the longitudinal axis of the mold, solely by the ceramic or other material within the mold. Hence, the arbors are free to shift radially inwardly with the material upon compression thereof just as though the arbors were part of the material. The mold assembly as shown in FIGURE 3 is placed within a conventional isostatic press which provides a chamber 28 filled with fluid, for example, oil or water, which surrounds the collapsible resilient mold 4. Pressure is then applied, by means of the fluid, to cause radially inward movement of the tubular mold wall thereby tightly compressing the material within the mold. As the material shifts radially inwardly during the compression, the arbors likewise shift radially inwardly with the material. Since the density of the material is uniform, the arbors have no tendency to shift independently of the material during compression and hence the precise predetermined bore configuration is attained in the compact resulting from the compressing operation. FIGURE 4 shows the mold assembly and material at the conclusion of the fluid pressure cycle. The same result can be obtained by using a conventional water press in which the entire mold assembly is immersed. In this instance a supporting outer shell or fixture is required to maintain the desired spacing between the end plates 25 and 26 so that pressure on the end plates does not tend to bias the end plates toward each other and thereby cause restriction of the movement of the arbors.

After compression is complete, the fluid pressure is relieved and the resilient mold assumes its normal shape. The mold is removed from the pressing chamber and disassembled, and the compressed self-sustaining green compact, now free within the mold because of its small cross-section, is removed from the mold. The arbors retain their same size and shape through the pressing operation and can be easily pushed out of the green compact from one end or the other thereof. The green compact is then fired, generally to sintering temperature, to complete the manufacture. The temperature used for firing will, of course, depend upon the material being used as well known in the art.

As alluded to above, there is substantially no underdesirable unauthorized shift of the arbors during the compressing operation. The precision with which the arbors shift during compression is sufficiently high that it is possible with the practice of the invention to isostatically press tubular members on the order of 3 feet or more in length and with multiple bores therethrough and while yet maintaining substantially the exact parallelism desired between bores. The bores can be of round, triangular, square or of other cross-section as desired. The external shape of the article can also be as desired. The article shown in FIGURE 1 has a hexagonal outer shape, for example, and this is attained in the pressing operation by utilizing a hexagonal-shaped resilient mold 4. Other outer shapes may be pressed by utilizing corresponding mold shapes. If the external shape desired is somewhat more complex than can be attained in the pressing operation, as may sometimes be the case, it is a simple matter to press the article to thick-walled cylindrical or other simple shape and then subsequently machine away, as on a lathe, some portions of the outer surface of the article to provide the precise external shape desired. Such machining, which is well known in the isostatic pressing art, is performed on the green compact prior to firing. Grinding of the fired parts is, of course, also possible though for ceramic parts extensive machining is costly and difficult.

The following additional points will be of assistance in the practice of the invention.

For the manufacture of bored articles the arbors can ideally be made of tungsten carbide though steel or other material can be used if desired. To best assure against undesirable frictional contact of the arbors with the metal end plates of the mold during the compressing operation it is desirable that the arbors have a length which is slightly less than the distance between the end plates 12 and 25.

Where vibration is used when filling the mold, a suitable clamp can be used between the filling base 6 and the filling cap 14 to prevent disassembly by way of the vibration. The clamp pressure should, of course, be sufficient to maintain the assembly but not so great as to cause distortion of the resilient mold 4. Ideally, the clamp can be a part of a fixture used during filling and vibration to both maintain the assembly, as shown in FIGURE 2, and to prevent radial expansion of the mold 4.

The invention is most desirable for, but is not limited to the manufacture of articles having through bores or inserts. For the manufacture of articles having one or more bores or inserts which extend only part way through the article, the arbors are formed of the desired length to extend upwardly from the mold base the desired amount, and the support pins 10 along with the mating recesses in the arbors may be shaped to sufficiently close tolerances to assure the desired spacing and orientation of the arbors through the filling operation. To accomplish this the support pins 10 and their mating recesses in the arbors can be made of somewhat greater length than is shown in FIGURE 2. Where such shortened arbors are used to provide blind bores it will also be desirable to shape the ends of the recesses in the arbors to allow insertion of a tool for each removal of the pins after the compressing operation. Other means to locate and simplify removal of such shortened arbors may, of course, be used.

It is much preferred that during the compressing operation the arbors be supported solely by the material being compressed within the mold as described above. However, as another though generally less advantageous embodiment, the arbors can be supported during the filling operation by compressible end plates of organic plastic foam or other material having compressive characteristics substantially identical to those of the finely divided material being compressed. Such end plates can remain in the mold during the pressing operation. The disadvantages in the use of such compressible end plates is the difficulty in precisely matching the compression characteristics of the compressible end plates with those of the material being compressed, and the difficulty in maintaining the desired optimum prevision in location of the arbors.

Generally, it will be desired to have the bore or bores in the article extend coaxially with the longitudinal axis of the article and hence the arbors will be positioned with their longitudinal axis precisely coaxial with that of the mold. However, the arbors may, if desired, be placed at an angle to the longitudinal axis of the mold. Also curved instead of straight arbors may be used though if the arbors are to be removed prior to firing, the curvature should not be so great as to prevent removal of the arbors.

Figure 5:
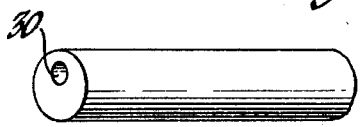
FIGURE 5 is a perspective view of another tubular shaped body made in accordance with the invention.

FIGURE 5 shows an article having a single bore 30 which is in non-concentric relationship with respect to the outer surface of the article. Heretofore it has been necessary, for manufacture of such an article by the isostatic process, to first isostatically press the body concentrically about a central fixed arbor and then subsequently machine away the outer surface of the pressed article to provide the non-concentric relationship between the outer surface and the bore. For thin and commensurately fragile bodies such extensive machining is difficult and expensive with considerable scrap loss. In accordance with the present invention such an article can be manufactured without need for this machining step. That is, a single arbor is used in a resilient mold, the arbor being positioned in its desired non-concentric relationship with respect to the mold and being supported during the compression step only by the material within the mold such that it moves with the material during compression thereof, all as described above.

Figures 6, 7:
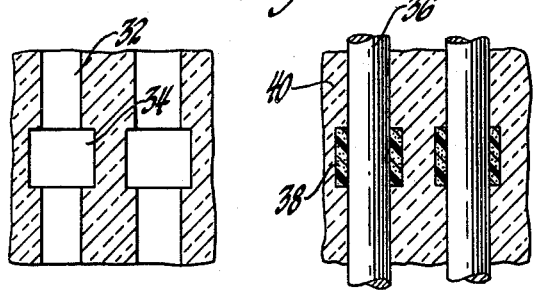
FIGURE 6 is a partial view in section of still another body made in accordance with the invention.
FIGURE 7 is a side view in section and with parts broken away of the mold and arbor structure which can be used for the manufacture of the article shown in FIGURE 6 in accordance with the invention.

FIGURE 6 shows an article having multiple bores 32 of non-uniform cross-section. That is, each bore has a portion 34 of enlarged diameter. Such a shape can be manufactured in accordance with the invention by placing on the arbors annular inserts of vaporizable or burnable organic material, for example paraffin wax or organic plastic, as shown in FIGURE 7. In FIGURE 7, 36 is one of the arbors, 38 the annular insert of organic material, and 40 the material of which the article is being manufactured. When the arbor is removed from the green compact after the compressing operation, it slides out of the insert and the insert remains in the article until the firing operation at which time it is vaporized or burned out to thereby provide the bore section of enlarged diameter. The annular inserts can also be made of ceramic or other material which remains in the article through the firing operation to thereby provide a composite unitary article.

It will be understood that means other than the support pins shown at 10 and 14 in FIGURE 2 can be used to support the core pins during filling of the mold. Also, any of various techniques or means can be used to detach the arbor support means prior to the pressing operation. For example, the filling cap, instead of being of unitary construction, can be of two-piece construction, i.e. two plates, such that the bottom plate can be left in place upon withdrawal of the support pins. That is, the filler cap can comprise a top end plate for the mold having pin openings and filler openings, and an annular member which has the downwardly extending arbor support pins secured thereto plus a central opening communicating with the filler openings in the top end plate. The top surface of the annular member leading to the filler openings can be funnel shaped. After filling, the annular member can then be withdrawn thereby withdrawing the support pins from the arbors and the top end plate. Prior to the pressing operation, the annular member can be replaced by a plate having pins which fill the pin openings and the filler openings in the top end plate.

The method as described can also be used to manufacture articles having inserts therein which case the arbors are made of the material desired for the inserts and are left in the pressed article to become an integral part thereof. For example, a ceramic article like that shown in FIGURE 1, but with inserts of porous ceramic therethrough instead of bores, can be manufactured, as above described, by using preformed and prefired rods of porous ceramic as the arbors, these porous ceramic rods being left in the pressed article through the firing operation whereby during sintering there is accomplished a unitary composite ceramic article having a dense casing but with porous passages therethrough. Another manner of making such an article is to use as the arbors prepressed but unfired rods of a mixture of organic material and ceramic powder which, upon firing, provides the desired porosity. Upon subsequent firing, the inserts and the compacted body surrounding the inserts are sintered at the same time.

Also, the arbors can be of a different ceramic or other material than that which is compacted around the arbors being left in place through the firing operation to attain a composite unitary article with inserts of one material surrounded by another material. For example, arbors of a ceramic having electrical conductive properties, such as a mixture of alumina and iron oxide or the like, can be used and alumina compressed around these arbors. The resulting fired article consists of a body of dense sintered alumina with cores or rods of conductive material.

Hence, while the invention has been described with respect to certain preferred embodiments thereof, various changes and modifications may be made all within the spirit and scope of the invention and the claims which follow.

The embodiments of the invention in which an exclusive property or privilege is claimed are defined as follows:

1. A method for making an article by compaction of a compactable particulate material selected from the group consisting of ceramic and metal including the steps of placing said compactable particulate material within a resilient collapsible generally tubular-shaped mold, said mold having therein at least one arbor which is supported in fixed spaced relationship to said mold while said compactable particulate material is placed in said mold, removing the support for said arbor after said particulate material is placed in said mold whereby said arbor is thereafter supported in directions normal to the longitudinal axis of said mold only by said particulate material and is free to move with said particulate material upon compaction thereof, applying fluid pressure to the exterior of said mold to thereby compact said particulate material into a self-sustaining compact, and thereafter removing said compact from said mold.

2. A method as set forth in claim 1 wherein said arbor is removed from said compact and said compact is fired to sinter said material to an article having a bore therein.

3. A method as set forth in claim 1 wherein said compact is fired to sinter said material, said arbor remaining in said compact during sintering and being of a material which withstands the sintering temperature thereby to provide a fired article having an insert therein.

4. A method as set forth in claim 3 wherein said arbor is of a material which provides a porous insert in said fired article.

5. A method as set forth in claim 3 wherein said arbor is of a material which provides an insert in said article of a composition different than that of the particulate material compacted around the arbor in the pressing step.

6. A method for making an article by compaction of a compactable particulate material selected from the group consisting of ceramic and metal including the steps of placing said compactable particulate material within a resilient collapsible generally tubular-shaped mold, said mold having therein a plurality of arbors which are supported in fixed spaced relationship to said mold and to each other while said compactable particulate material is placed in said mold, removing the support for said arbors after said particulate material is placed in said mold whereby said arbors are thereafter supported in directions normal to the longitudinal axis of said mold only by said particulate material and are free to move with said particulate material upon compaction thereof, applying fluid pressure to the exterior of said mold to thereby compact said particulate material into a self-sustaining compact, and thereafter removing said compact from said mold.

7. A method as set forth in claim 6 wherein said arbors are removed from said compact and said compact is fired to sinter said material to an article having a plurality of bores therein.

8. A method as set forth in claim 6 wherein said compact is fired to sinter said material, said arbors remaining in said compact during sintering and being of a material which withstands the sintering temperature thereby to provide a fired article having a plurality of inserts therein.

9. A method as set forth in claim 8 wherein said arbors are of a material which provides porous inserts in said fired article.

10. A method as set forth in claim 8 wherein said arbors are of a material which provides inserts in said article of a composition different than that of the particulate material compacted around the arbors in the pressing step.

References Cited

UNITED STATES PATENTS

| | | | |
|---|---|---|---|
| 408,213 | 8/1889 | Carter. | |
| 2,506,244 | 5/1950 | Stopka | 264—59 |
| 2,859,794 | 11/1958 | Barr | 106—69 |
| 3,051,567 | 8/1962 | Ziegler | 264—56 |
| 3,100,677 | 8/1963 | Frank et al. | 264—313 |
| 3,246,056 | 4/1966 | Shea et al. | 264—313 |
| 3,345,160 | 10/1967 | Miccioli | 264—59 |

OTHER REFERENCES

Article by Daniel W. Luks, "Porous Ceramics" appearing in Ceramic Age, vol. 70, No. 3, 1957, pp. 32–35.

A. E. Dodd: "Dictionary of Ceramics", 1964, p. 259.

D. G. Loomis: "Isostatic Pressing For Ceramics", an article appearing in the July 1962 issue of Ceramic Age at pp. 36–40.

J. J. Svec: "Isostatic Pressing Expands Manufacturing Capabilities," an article appearing in the November 1964 issue of Ceramic Industry at pp. 55, 63, 66, 67, 70 and 71.

JULIUS FROME, Primary Examiner

JOHN H. MILLER, Assistant Examiner

U.S. Cl. X.R.

264—60, 88, 277, 278, 313, 314, 315